UNITED STATES PATENT OFFICE.

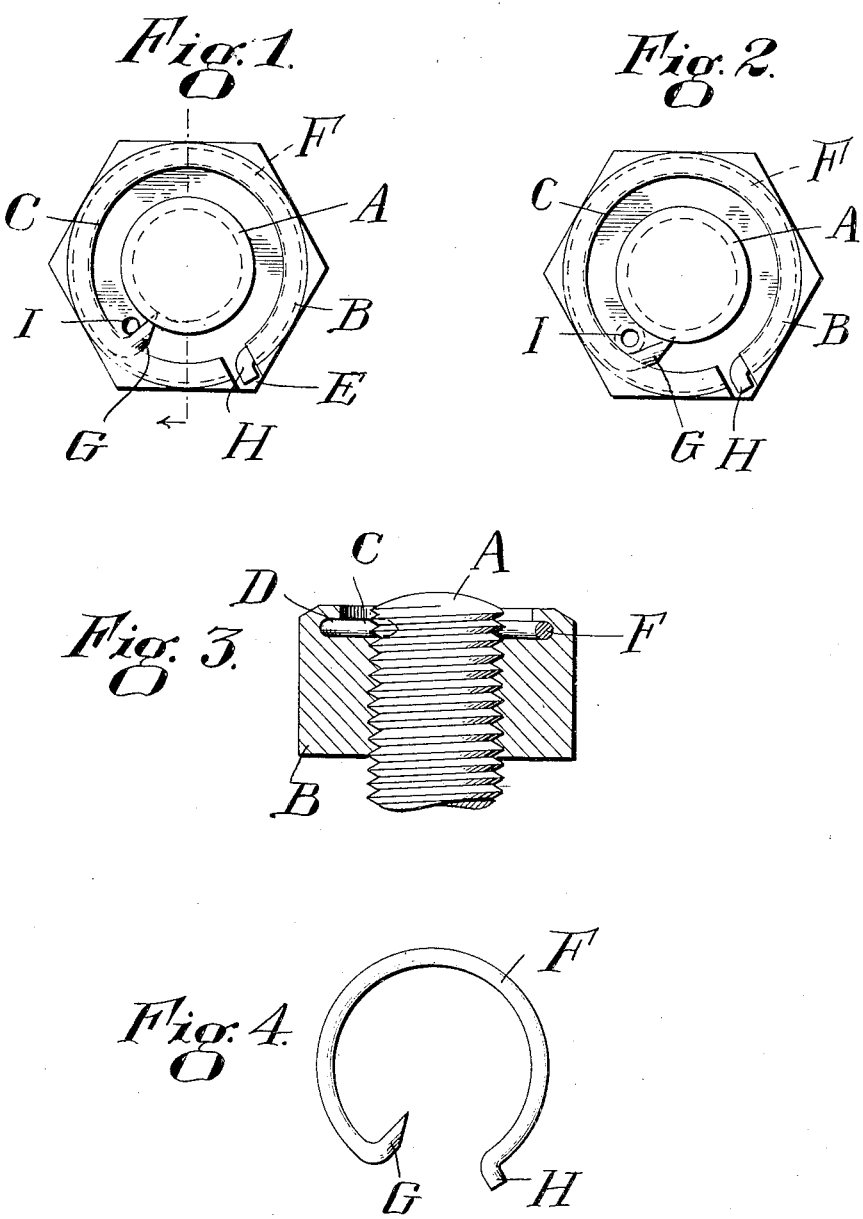

NAPOLEON R. THIBERT, OF WORCESTER, MASSACHUSETTS.

LOCK-NUT.

1,352,103.　　　　Specification of Letters Patent.　　Patented Sept. 7, 1920.

Application filed April 4, 1919. Serial No. 287,482.

*To all whom it may concern:*

Be it known that I, NAPOLEON R. THIBERT, a citizen of the United States, residing at Worcester, in the county of Worcester and State of Massachussets, have invented a new and useful Lock-Nut, of which the following is a specification.

The object of this invention is to provide a new and improved lock nut which can be screwed up on a bolt and which will automatically lock in adjusted position.

The improved device is shown in the accompanying drawing, in which—

Figure 1 is a plan view;

Fig. 2 is a similar view illustrating the disengagement of the spring;

Fig. 3 is a sectional view, and

Fig. 4 is a plan view of the locking spring.

Referring to the drawing, A designates an end of a bolt on which the lock nut B is screwed. The nut B is provided with a circular recess C in its top face, the bottom of said recess being under-cut so as to leave a circular groove D. A radial slot E is cut through the outer wall bounding the circular recess. F designates a partial circular wire spring which is shaped to fit tightly in the groove D throughout its circular extent. One end of said spring is sharpened and bent inwardly to form a pawl G which will engage in the thread of the bolt. The other end H of the circular spring F is bent radially outwardly for engagement with said slot E.

The circular spring F is snapped in position in the groove D, and the radial end H of the same fitted in the slot E. As the spring fits tightly throughout its circular extent in the groove D, when the parts are assembled in this manner the spring cannot rattle out of the nut and the lock nut can be handled as an article of commerce. The nut is applied to the bolt in the ordinary way and screwed up to the desired position. As this action takes place the pawl end G of the wire spring will slip around in the thread of the nut, but when the nut is in adjusted position, the pawl will engage tightly in the thread and lock the nut in position and prevent any rotation thereof, tending to unscrew the nut from the bolt.

This action particularly will take place as the partial circular wire spring fits tightly in the groove throughout its circular extent, and there can be no backlash between the spring and the nut.

In practice, it has been found that vibration will tend to tighten the lock nut on the screw.

A hole I is bored in the bottom of the grooved recess in such position relatively to the pawl-like end G of the circular spring that an implement, such as a wire nail, can be inserted in said hole I to hold the pawl-like end G of the circular wire spring out of engagement with the thread on the bolt when it is desired to unscrew the lock nut from the bolt.

By using the radial slot E cut entirely through the outer wall bounding the circular recess C, not only will the spring be held tightly circumferentially in place, but if it is desired to remove the spring from the nut the same can be done by engaging a nail or other sharp instrument with the radial engaging end H of the spring, and then prying the spring out of the grooved recess. It is advantageous to do this in this manner instead of from the pawl end G of the spring as, if an implement were engaged with the latter it would be apt to wear the thread of the bolt, if the nut were in engagement with the bolt, or it would be apt to bend or distort the pawl end G of the spring so that the same could not thereafter properly act as a pawl for holding the nut in position.

The details and arrangements herein shown and described may be greatly varied by a skilled mechanic without departing from the scope of my invention as expressed in the claim.

Having thus fully described my invention, what I claim and desire to secure by Letters Patent is:

A lock nut comprising a screw-threaded nut having a circular grooved recess therein provided with a plane bottom sunk below the end or face of the nut and with a slot, a partial circular wire spring fitted in said recess to bear against the wall thereof all around, one end of said spring being sharpened and bent inwardly for pawl-like engagement in the thread of the bolt, and the other end being bent for engagement with the slot in said nut, the bottom of said circular recess being formed with a hole located at the side of said sharpened end opposite said slot, whereby an implement can be inserted in said hole to engage and move said sharpened end of the spring circumferentially and hold it out of engagement with the thread of the bolt when it is desired to unscrew the nut.

In testimony whereof I have hereunto affixed my signature.

NAPOLEON R. THIBERT.